Jan. 1, 1957 P. DIETRICH 2,776,136
GRIPPER BAR SUPPORT FOR SHEET PRINTING PRESS
Filed May 12, 1951
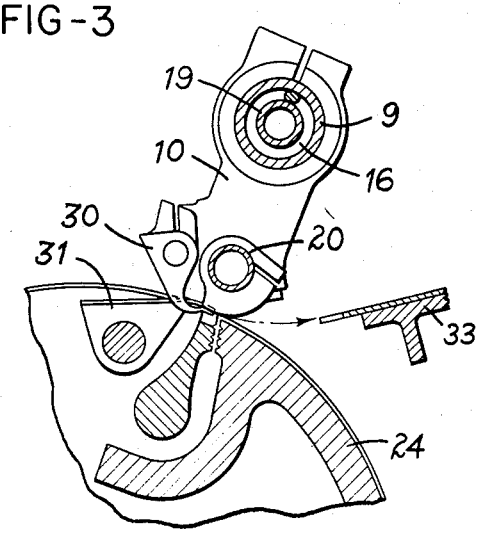
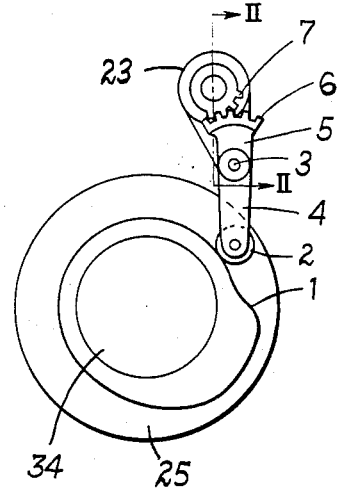
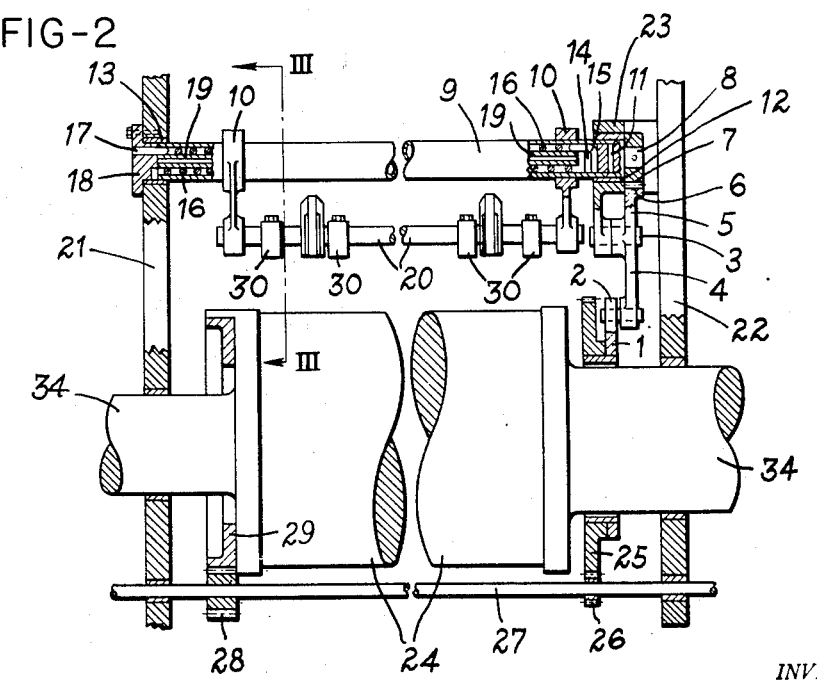
INVENTOR.
PAUL DIETRICH
BY
ATTORNEYS United States Patent Office 2,776,136
Patented Jan. 1, 1957

2,776,136

GRIPPER BAR SUPPORT FOR SHEET PRINTING PRESS

Paul Dietrich, Augsburg, Germany, assignor to Maschinenfabrik Augsburg-Nurnberg A. G., Augsburg, Germany, a corporation of Germany Application May 12, 1951, Serial No. 225,972

Claims priority, application Germany June 22, 1950

5 Claims. (Cl. 271—51)

This invention relates to a control of the auxiliary gripper for sheet printing presses, of the type comprising a control lever urged against a cam by a spring. In known controls of this type, the spring used to be designed as a compression spring supported on a stationary part of the machine in such a way that the control lever was directly engaged by this spring and urged against the cam. Since only a limited space is available for accommodation of this spring, there were close limits for its dimensions and it had to be made relatively stiff so as to be able to exert the high pressures required owing to the large strokes of the control lever and the size of the masses of the auxiliary gripper which had to be accelerated and retarded. However, since this causes considerable difficulties, an arrangement has been adopted in which the opposite end of the spring bears on the freely swinging end of a second lever which is guided on a second cam in such a way that the spring in all positions retained practically the same length. This modification requires a second cam with the appertaining lever mechanism, thus being complicated, expensive, and requiring much space.

It is an object of the present invention to provide a design in which the spring is accommodated in a more suitable manner.

Another object of the invention is to reduce the space required for accommodating the spring.

With these and further objects in view, which will hereinafter appear, according to the present invention the spring, more particularly a coiled bending spring, is accommodated in the hollow shaft of the auxiliary gripper, one end of the spring being connected to a control part and its opposite end being connected to a stationary machine part. The hollow space within the shaft, extending from one side wall of the machine to the opposite side wall, is so large that a spring of the dimensions required for the auxiliary gripper control can be accommodated, so that the above mentioned movable support of the free end of the spring by means of a second lever controlled by a second cam can be dispensed with. Moreover, the spring is invisible and protected against soiling.

A particularly simple method of fastening the spring will be obtained by supporting the same on a stationary point on the side of the machine opposed to the control lever. In order that it may not buckle in view of its relatively large length, it is preferred to arrange a stationary guide bar within the hollow space inside of the turns of the coiled bending spring.

Other and further objects, features and advantages of the invention will be pointed out hereinafter and appear in the appended claims forming part of the application.

In the accompanying drawings a now preferred embodiment of the invention is shown by way of illustration and not by way of limitation.

Fig. 1 is a front view seen from one side of the machine,

Fig. 2 is a plan view, partly in a section on line II—II of Fig. 1, and

Fig. 3 is a detailed showing partly in section along the line III—III of Fig. 2 on an enlarged scale showing the operation of the gripper bar.

Referring to the drawing, the main frame members of the press are indicated generally at 21 and 22. Journaled in these main frame members are the shafts 34 for the impression cylinder 24. Affixed to one end of cylinder 24 is gear 29 which is driven by gear 28 mounted on driveshaft 27 connected to the main source of power (not shown) of the press. At the other end of the impression cylinder adjacent frame member 22 is gear 25 which is freely rotatable on shaft 34. This gear carries cam 1 and is driven by gear 26 mounted on driveshaft 27.

It will be seen that the cam 1, which is driven in a suitable known manner as indicated above, is arranged at one side of the machine and engaged by the roller 2 of a two-armed lever 4, 5, pivoted on a stationary fulcrum 3 mounted on arm 23 carried by frame member 22. The lever 4, 5 carries a toothed segment 6 meshing with a toothed segment 7 secured on a journal pin 8 by a split pin. The journal pin 8 is fixedly connected to the tubular hollow shaft 9 by means of a pin 11. The shaft 9 is rotatably mounted in the frame members 21, 22 of the machine, at 12 (journaled in arm 23) and 13, and bears the auxiliary gripper bar 20 mounted on arms 10. The pin 8 is formed with a recess 14 engaged by one end 15 of the coiled bending spring 16 whose opposite end 17 is fixedly supported on a disc 18 secured to the frame member 21 of the machine. This disc 18 moreover bears a guide tube 19 projecting into the hollow space within the turns of the coiled bending spring 16 so as to prevent the same from buckling.

It will thus be seen that the two arms 10, fixedly mounted on hollow shaft 9, describe a swinging motion to and from cylinder 24 as shaft 9 is rotated, thus carrying gripper bar 20 back and forth between cylinder 24 and table 33 (Fig. 3) on which rest the sheets to be printed. The grippers 30, carried by gripper bar 20, may be of any suitable known construction for gripping sheets to be printed at table 33 and carrying them to cylinder 24 to be gripped in turn by conventional gripping mechanism 31 on the cylinder. In operation, the hollow shaft 9 is rotated, according to the configuration of cam 1, by the swinging movement of lever 4, 5 about pivot 3, which movement is transmitted to the shaft 9 through the meshing engagement of toothed segments 6 and 7. This rotation of shaft 9 swings the arms 10, carrying gripper bar 20 and grippers 30, first to table 33 to pick up a sheet to be printed and then toward cylinder 24 to deliver the sheet to the grippers 31 on the cylinder. The coil spring 16, having one end affixed at 17 to the frame member 21 and the other end affixed at 15 to the hollow shaft 9, constantly urges rotation of the shaft 9 in one direction so that the roller 2 is constantly urged against cam 1. The tension and strength of spring 16 is such, however, that shaft 9 may be rotated against the spring tension as cam 1 forces the lever 4, 5 in a direction to twist hollow shaft 9 against the spring tension.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a sheet printing press having an impression cylinder and a gripper bar adapted for swinging movement to and from said cylinder for delivering sheets thereto in timed relation with the rotation of said cylinder, the combination which comprises a hollow shaft rotatably mounted substantially parallel to said cylinder, means for mounting said gripper bar on said shaft for swinging movement about the axis thereof upon rotation thereof, a control lever at one end of said hollow shaft effecting rotation thereof to produce said swinging movement of said gripper bar, cam means effecting movement of said control lever in one direction in timed relation with rotation of said cylinder, and spring means within said hollow shaft and extending substantially across said printing press for urging said shaft and said control lever in the opposite direction against said cam means.

2. In a sheet printing press having an impression cylinder and a gripper bar adapted for swinging movement to and from said cylinder for delivering sheets thereto in timed relation with the rotation of said cylinder, the combination which comprises a hollow shaft rotatably mounted substantially parallel to said cylinder, means for mounting said gripper bar on said shaft for swinging movement about the axis thereof upon rotation thereof, a control lever at one end of said hollow shaft effecting rotation thereof to produce said swinging movement of said gripper bar, cam means effecting movement of said control lever in one direction in timed relation with rotation of said cylinder, and coil spring means within said hollow shaft urging said shaft and said control lever in the opposite direction against said cam means, said spring means extending substantially throughout the length of said hollow shaft.

3. In a sheet printing press having a main frame, an impression cylinder, and a gripper bar adapted for swinging movement to and from said cylinder for delivering sheets thereto in timed relation with the rotation of said cylinder, the combination which comprises a hollow shaft rotatably mounted substantially parallel to said cylinder, means for mounting said gripper bar on said shaft for swinging movement about the axis thereof upon rotation thereof, a control lever effecting rotation of said hollow shaft to produce said swinging movement of said gripper bar, cam means effecting movement of said control lever in one direction in timed relation with rotation of said cylinder, coil spring means within said hollow shaft and extending substantially throughout the length thereof and urging said shaft and said control lever in the opposite direction against said cam means, means for connecting one end of said coil spring to said control lever and the other end of said coil spring stationarily to said main frame and a stationary shaft within said spring and said hollow shaft preventing buckling of said spring during twisting movements thereof.

4. In a sheet printing press having a main frame, an impression cylinder, and a gripper bar adapted for swinging movement to and from said cylinder for delivering sheets thereto in timed relation with the rotation of said cylinder, the combination which comprises a hollow shaft rotatably mounted substantially parallel to said cylinder, means for mounting said gripper bar on said shaft for swinging movement about the axis thereof upon rotation thereof, a control lever at one end of said hollow shaft effecting rotation thereof to produce said swinging movement of said gripper bar, cam means effecting movement of said control lever in one direction in timed relation with rotation of said cylinder, coil spring means within said hollow shaft urging said shaft and said control lever in the opposite direction against said cam means, said coil spring extending substantially across said printing press, and means for affixing the end of said coil spring adjacent said control lever to said hollow shaft and the opposite end of said coil spring to the opposite side of said main frame.

5. In a sheet printing press having an impression cylinder, main side frames, and a gripper bar adapted for swinging movement to and from said cylinder for delivering sheets thereto in timed relation with rotation of said cylinder, the combination which comprises a hollow shaft parallel to said cylinder, means for mounting said shaft rotatably in said main side frames, means for mounting said gripper bar on said hollow shaft for swinging movement about the axis thereof upon rotation of said shaft, a control lever pivoted at one of said side frames, a first toothed segment at one end of said control lever, a second toothed segment on said hollow shaft meshing with said first toothed segment on said control lever, said pivoted control lever and said toothed segments cooperating for effecting rotation of said hollow shaft about the axis thereof upon swinging movement of said control lever, a cam engaging the end of said control lever opposite to said toothed segment for effecting swinging movement of said control lever in one direction, means for driving said cam in timed relation with said cylinder, coil spring means within said hollow shaft and extending substantially across said printing press, means for affixing one end of said spring means to said shaft adjacent said control lever and the other end to said main side frame for urging said shaft and said control lever in another direction against said cam, and a stationary shaft within said coil spring means preventing buckling of said spring means during twisting movements thereof.

References Cited in the file of this patent

UNITED STATES PATENTS

| | | |
|---|---|---|
| 139,458 | Dick | June 3, 1873 |
| 343,454 | Hawkins | June 8, 1886 |
| 577,381 | Harris | Feb. 16, 1897 |
| 1,806,856 | Kolmer et al. | May 26, 1931 |
| 1,957,880 | Fankboner | May 8, 1934 |
| 2,246,508 | Davidson | June 24, 1941 |
| 2,618,479 | Peyrebrune | Nov. 18, 1952 |